(12) United States Patent
Le Corre (10) Patent No.: US 10,775,019 B2
(45) Date of Patent: Sep. 15, 2020

(54) CONTROLLED CAUSTIC GENERATOR SURFACE LIGHTING DEVICE FORMING A PATTERN ON A TARGET SURFACE

(71) Applicant: VALEO VISION, Bobigny (FR)

(72) Inventor: Jerome Le Corre, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/262,109

(22) Filed: Jan. 30, 2019

(65) Prior Publication Data

US 2019/0234585 A1 Aug. 1, 2019

(30) Foreign Application Priority Data

Jan. 30, 2018 (FR) ...................... 18 50758

(51) Int. Cl.
| | |
|---|---|
| F21V 7/04 | (2006.01) |
| F21S 43/14 | (2018.01) |
| F21S 43/20 | (2018.01) |
| F21S 41/143 | (2018.01) |
| F21S 41/275 | (2018.01) |
| B60Q 3/74 | (2017.01) |
| F21S 41/20 | (2018.01) |
| B60Q 3/60 | (2017.01) |

(Continued)

(52) U.S. Cl.
CPC ............... *F21V 7/048* (2013.01); *B60Q 3/60* (2017.02); *B60Q 3/74* (2017.02); *F21S 10/002* (2013.01); *F21S 41/143* (2018.01); *F21S 41/275* (2018.01); *F21S 41/285* (2018.01); *F21S 43/14* (2018.01); *F21S 43/26* (2018.01); *F21S 43/33* (2018.01); *F21V 5/002* (2013.01)

(58) Field of Classification Search
CPC ........... F21V 7/048; F21V 5/002; B60Q 3/60; B60Q 3/74; F21S 43/33; F21S 43/14; F21S 43/26; F21S 41/275; F21S 41/143; F21S 41/285
USPC ........................................................ 362/509
See application file for complete search history.

(56) References Cited

U.S. PATENT DOCUMENTS

| | | | |
|---|---|---|---|
| 8,408,775 B1 * | 4/2013 | Coleman ................... | F21V 7/04 362/602 |
| 8,500,310 B2 * | 8/2013 | Sakamoto ............ | H05K 5/0017 362/330 |

(Continued)

FOREIGN PATENT DOCUMENTS

| | | |
|---|---|---|
| DE | 197 00 845 A1 | 7/1998 |
| DE | 10 2010 032 946 A1 | 2/2012 |

(Continued)

OTHER PUBLICATIONS

French Preliminary Search Report dated Sep. 28, 2018 in French Application 18 50758 filed on Jan. 30, 2018 (with English Translation of Categories of Cited Documents).

*Primary Examiner* — Bryon T Gyllstrom
(74) *Attorney, Agent, or Firm* — Oblon, McClelland, Maier & Neustadt, L.L.P.

(57) ABSTRACT

A vehicle lighting device including an optical element having a controlled caustic generator surface so as to propagate a pattern over a usable range, a mounting part on which is intended to be mounted a beam generator of rays incident on the generator surface, the optical element being such that the propagated pattern is projected onto a target surface, visible from the exterior of the lighting device and situated in the usable range.

20 Claims, 8 Drawing Sheets

(51) Int. Cl.
*F21S 43/33* (2018.01)
*F21S 10/00* (2006.01)
*F21V 5/00* (2018.01)

(56) References Cited

U.S. PATENT DOCUMENTS

| | | | | |
|---|---|---|---|---|
| 8,757,849 | B2 * | 6/2014 | Brick | G02B 3/0006 362/311.01 |
| 8,777,474 | B2 * | 7/2014 | Shim | G02B 6/0038 362/615 |
| 8,858,056 | B2 * | 10/2014 | Chang | G02B 6/0055 362/619 |
| 2003/0016539 | A1 * | 1/2003 | Minano | F21V 7/04 362/347 |
| 2003/0214812 | A1 * | 11/2003 | Bourdelais | G02B 5/0221 362/330 |
| 2005/0052742 | A1 | 3/2005 | Brinkmann et al. | |
| 2006/0239006 | A1 * | 10/2006 | Chaves | G02B 6/0018 362/294 |
| 2009/0190324 | A1 * | 7/2009 | Watanabe | B60Q 1/085 362/40 |
| 2009/0296407 | A1 * | 12/2009 | Bailey | F21V 5/04 362/309 |
| 2012/0268950 | A1 * | 10/2012 | Parkyn | F21V 5/04 362/335 |
| 2016/0327230 | A1 * | 11/2016 | Kieslinger | G02B 5/021 |
| 2017/0166111 | A1 * | 6/2017 | Baccarin | F21S 43/13 |

FOREIGN PATENT DOCUMENTS

| | | |
|---|---|---|
| EP | 3 178 699 A1 | 6/2017 |
| FR | 608 867 | 8/1926 |
| FR | 2 996 629 A1 | 4/2014 |
| JP | 2013-51168 | 3/2013 |

* cited by examiner

CONTROLLED CAUSTIC GENERATOR SURFACE LIGHTING DEVICE FORMING A PATTERN ON A TARGET SURFACE

The present invention relates to the field of lighting devices emitting patterns onto a given surface, notably onto the road.

The document WO2016184721A1 discloses vehicle lighting devices comprising two transparent material plates the front and rear diopters of which each have a surface forming a matrix of optical lenses. A cache is disposed between the two plates. The cache and the optical lenses of each matrix are pressed together and are such as together to form a given light pattern.

However, a design of this kind is complex.

The technical problem that the invention aims to solve is therefore to simplify a vehicle lighting device able to produce light patterns, notably to project them onto a surface.

To solve this problem, the applicant has had the idea of using caustics.

Caustics are an optical phenomenon that have been known for a long time. They are for example observable at the bottom of a swimming pool lit by the sun. They form there fluctuating patterns forming overall a mesh of lines of more concentrated and therefore brighter light, with darker zones between the meshes. These lines and dark zones are caused by different fluctuations of the surface of the water. These fluctuations locally form variations of orientation with respect to the globally plane shape of the surface of the water. Accordingly, as a function of the local variations encountered, the rays are going to be deviated differently, some moving toward one another and forming the more concentrated and therefore brighter lines, and others moving away from each other and forming the dark zones. The meshing varies as a function of the agitation of the surface.

For a few years researchers have been interested in methods for using this phenomenon on fixed surfaces featuring local variations, to generate complex caustics of controlled shape. In particular, they have developed various methods for calculating refractive surfaces formed of a transparent material with a distribution and an arrangement of local variations such that, when these refractive surfaces are lit by a given light source, they enable a pattern to be formed on a screen.

In some of this work, this pattern, termed the target pattern, corresponds physically to a distorted image of the raised pattern that the local variations form, termed the subject pattern.

The applicant has realized that such surfaces could be used in vehicle lighting devices.

The invention therefore relates to lighting devices in which a controlled caustic generator surface deviates the light rays from a light source, this generator surface featuring local variations adapted to form a particular pattern on a given surface.

To this end, a first object of the invention is a vehicle lighting device comprising:
- an optical element having a controlled caustic generator surface, this generator surface being a reflecting or refracting surface, extending in accordance with a given overall shape and having local variations of shape about this given overall shape, these local variations being distributed over the whole of said generator surface so that they confer on the whole of the generator surface a relief forming an object pattern, these various local variations being such that the majority of said generator surface is smooth and such that for a beam of rays incident on the whole of said generator surface, these rays having a given distribution, said generator surface deviates the rays with different orientations as a function of the local variations that they encounter, thus forming a deviated beam propagating an identifiable propagated pattern over a usable range extending in the upstream direction and at least as far as a given finite optimum propagation distance, this propagated pattern corresponding to a distorted projection of the object pattern,
- a mounting part on which is to be mounted a beam generator of rays in accordance with the given distribution, so that the rays are incident on said generator surface, the optical element being such that the propagated pattern can be projected onto a target surface, which is visible from outside the lighting device and which is situated inside the usable range and/or at a distance substantially equal to said optimum distance.

By "identifiable" is meant that the pattern is recognized as that which will be observed at the optimum distance.

The best result is seen when the target surface is situated at a distance substantially equal to this optimum distance.

In the application, by "smooth" is meant a zone that can be differentiable at any point, in other words a zone free of projecting or recessed edges. A portion is smooth when all the points forming it conforms to this definition.

It is therefore possible to mount a light beam generator, such as a light source or a light source and a set of one or more optical elements, enabling generation of rays with a given distribution, so that these rays are incident on the optical element. Because of this, energizing the beam generator will enable generation of the propagated pattern, which will propagate until it encounters a surface, in particular the target surface.

The projection of the propagated pattern on the target surface forms the target pattern.

These beam generators can be simple. The optical element is sufficient in itself modify the beam to make a pattern from it.

Moreover, this pattern is propagated over a finite given distance, namely over the usable range comprising the distance where the sharpness is the optimum, namely the optimum propagation distance, which allows some freedom in respect of the distance between the optical element and the target surface. The lighting device is simpler to assemble. This optimum propagation distance, referred to hereinafter as the optimum distance, is the distance at which the majority of the deviated rays forming the target pattern cross and therefore at which this pattern is sharpest. The generator surface can therefore be easily designed in relation to this definition.

Moreover, in contrast to the solutions with caches, in the lighting device in accordance with this first object, most, or even all, of the light rays encountering the generator surface are deviated and form the target pattern. The brightness of the target pattern is therefore greater with the lighting device according to this first object.

The luminous device according to the invention may optionally comprise one or more of the following features:
- the given distribution is substantially such that for any plane transverse to, notably perpendicular to, the propagation direction, at a given point of that plane, the ray or rays incident at this point come from a single direction;

in the given distribution, the rays are substantially parallel or substantially distributed in an emission cone;

the given distribution corresponds to that of a light-emitting diode;

the lighting device comprises the ray beam generator in accordance with the given distribution; the lighting device is therefore ready to emit;

the generator surface comprises at least one smooth portion the surface of which represents the majority of the generator surface, the passage from one local variation to the other being smooth inside this smooth portion;

the majority of the generator surface is such that each local variation deviates the rays so as to form one and only one portion of the target pattern that is distinct from the portions of the target pattern formed by the other local variations and for the majority of the target pattern each portion of the target pattern receives light rays from one and only one local variation; therefore, for this majority of the generator surface and this majority of the target pattern, there is a bijective relation between each smooth portion of the object pattern and each portion of the target pattern with no marked brightness discontinuity; this simplifies the calculation and therefore the production of the generator surface.

all of the generator surface is smooth, the passage from one local variation to the other being smooth; this moreover enables less deformation of the image of the parts upstream of the optical element; it is therefore possible either to see these parts through the optical element, when the optical element is a transparent element refracting the rays emitted by said beam generator, or by observing the image of these parts on the optical element, when the latter is a reflector reflecting the rays emitted by said beam generator; this therefore enables modification of the style of the beam generator;

the whole of the generator surface is such that each local variation deviates the rays so as to form one and only one portion of the target pattern that is distinct from the portions of the target pattern formed by the other local variations and for all the target pattern each portion of the target pattern receives the light rays from one and only one local variation; there is therefore a bijective relation between the whole of the object pattern and each portion of the target pattern with no marked brightness discontinuity; this simplifies the calculation and therefore the production of the generator surface;

the passage between certain local variations is delimited by an edge; a passage of this kind creates a discontinuity in the slope variations over the generator surface; this makes it possible to create very dark and even black zones and very bright and narrow zones, such as clear writing;

the local variations are such that the rays of the deviated beam do not cross short of said optimum distance; the target pattern therefore remains sharp over a target surface positioned on the upstream or at the optimum distance;

according to the preceding paragraph, there can also be a minimum distance below which the pattern is not formed; in this case, the pattern is sharp in a range, corresponding to the usable range going from this minimum distance at least to the optimum distance; for example, this range represents more than half of the optimum distance;

the local variations have a tangent to the given overall shape forming an angle between −60 and 60 degrees inclusive, notably between −30 and 30 degrees inclusive; this enables good transmission of the light rays;

each local variation has, at each of its points, an amplitude defined as the distance between the local variation and said overall shape along the normal and at a given point of the overall shape;

the maximum amplitude of each local variation is in a range between 0.001 millimetre and 1 millimetre inclusive; this imparts a smoother appearance to the generator surface;

in an overall direction of propagation of the beam, the optical element is circumscribed in a rectangle, one side of which extending in a direction parallel to this propagation direction is at least four times greater, notably six times greater than that of the amplitude of each local variation relative to the given local shape at the level of that local variation;

in an overall propagation direction of the beam, the generator surface is circumscribed in a rectangle, one side of which extending in a direction parallel to that propagation direction is at least ten times greater, notably 30 times greater, than that of one of the sides of a light source of the beam generator;

the beam generator comprises a light source, notably a light-emitting diode; light-emitting diodes are particularly suitable for coupling to a controlled generator surface;

the beam generator comprises a light-emitting diode emitting its rays generally in accordance with a cone; for example, the generator may be formed only by one or more light-emitting diodes;

the beam generator comprises a light source, notably a light-emitting diode, and an optic adapted with the light source to generate a beam of substantially parallel rays;

the luminous device comprises a screen comprising a surface forming the target surface; the target pattern is therefore visible on or inside the lighting device;

the screen is formed by a textured surface translucent plate, notably arranged in front of the beam generator; this allows use of a simple screen; moreover, this screen placed in front of the beam generator enables the latter to be masked;

the lighting device comprises a housing and an outer lens closing the housing through which exit the rays emitted by the lighting device, the closing outer lens forming the screen, the target surface forming a part or the whole of the portion of the closing outer lens through which these rays exit; this enables display of a pattern, such as a logo or information on the lighting device; in particular, the target surface is a diffusing surface, for example a textured surface, or a surface coated with a diffusing film;

the lighting device is a signalling light, the generator surface and the target surface being such that the target pattern forms the lighting surface of the signalling function; a signalling light can therefore be produced with few parts;

the lighting device is intended to be mounted inside the passenger compartment of a vehicle, said lighting device being such that once mounted in the vehicle it can project the target pattern on the one hand outside said lighting device and on the other hand onto a surface of the passenger compartment arranged at a distance from the optical element in the usable range or substantially equal to the optical distance; this in particular enables creation of an ambience pattern, display of a logo; this lighting device may be specifically dedicated to this purpose or be a ceiling light or a side panel light;

the surface of the passenger compartment is a seat, a dashboard, a portion of the windscreen or a window, or a screen projecting from the dashboard, or a pillar carrying glazing, the ceiling of the passenger compartment; in particular, the surface of the passenger compartment may be a diffusing portion of the windscreen or a window, for example a textured surface portion or a portion covered with a diffusing film;

the optical element comprises a reflecting surface at least one portion of which is formed by the generator surface; in other words the generator surface is reflective; in particular, the optical element may be a mask, notably metallized; in this case the generator surface may form a portion of the surface of this mask; another function may thus be conferred on the mask, such as that of masking certain parts of the lighting device;

the optical element is made of a transparent material and is arranged with the beam generator to form the beam diverted by refraction of the rays emitted by the beam generator; this allows a simple layout;

according to the preceding paragraph, the optical element comprises an entry face for said rays arranged facing the beam generator and an exit face for these rays arranged opposite said entry face, the generator surface being formed on the entry face or on the exit face;

in accordance with the preceding paragraph, the optical element comprises two generator surfaces, a first generator surface being formed on the entry face and a second generator surface being formed on the exit face, these two generator surfaces being arranged jointly to form the target pattern and to provide the propagation over the optimum distance. This makes it possible to allow greater freedom in the slopes to be conferred on the local variations; moreover, this can also enable better contrast to be obtained, or the depth field to be increased, or even tend toward an infinite depth of field;

the lighting device comprises a housing and an outer lens closing the housing through which exit the light rays emitted by the lighting device, the closing outer lens forming the optical element, the generator surface being formed on the surface of a portion of the closing outer lens, the deviated beam being formed by refraction of the rays emitted by the beam generator; this therefore enables propagation of the target pattern outside the vehicle and without addition of any new part; for example, the lighting device may be such that once mounted on the vehicle the distance between the generator surface and the road in the direction of propagation of the target pattern corresponds to the usable range or is close to the optimum distance, according to a given orientation of the vehicle; this therefore enables projection of the light pattern onto the road; this distance between the closing outer lens and/or the generator surface may be equal to half the optimum distance, when the road is horizontal; in this latter case, this allows a visible sharp pattern whatever the orientation of the vehicle, climbing, descending, braking or accelerating;

the optical element comprises a reservoir containing a liquid and air forming between them a moving diopter, the reservoir comprising a transparent entry wall and a transparent exit wall facing the transparent entry wall, one of these walls comprising said generator surface, the light generator being such as to emit a light beam toward the transparent entry wall so that the rays pass in succession through the transparent entry wall, the moving diopter, and the transparent exit wall, passing through said generator surface; this notably enables display of a fixed pattern when the car is stopped or moving at constant speed, and causes it to disappear when the car starts, brakes or accelerates.

The vehicle lighting device according to the invention may for example be:
- a device for lighting the road, notably a front light, notably emitting a low beam and/or a long-range beam, or a fog light;
- a signalling device, notably a rear position light, a day running light (DRL), a turn indicator, a stop light, a high-level stop light, a rear fog light, a reversing light;
- a device for lighting the interior of the vehicle, notably a ceiling light or a side panel light.

The invention also has for object a vehicle comprising a lighting device according to the invention, notably connected to the electrical power supply of the vehicle.

The terms "upstream" and "downstream" refer to the direction of propagation of the light rays inside and outside the lighting device.

Unless otherwise indicated, the terms "front", "rear", "lower", "upper", "side", "transverse" refer to the direction of emission of light from the corresponding lighting device.

Other features and advantages of the invention will become apparent on reading the following detailed description of nonlimiting examples, for an understanding of which see the appended drawings, in which:

FIGS. 15$a$ to 15$f$ are diagrams of the various generator surface calculation steps.

Figure 1:
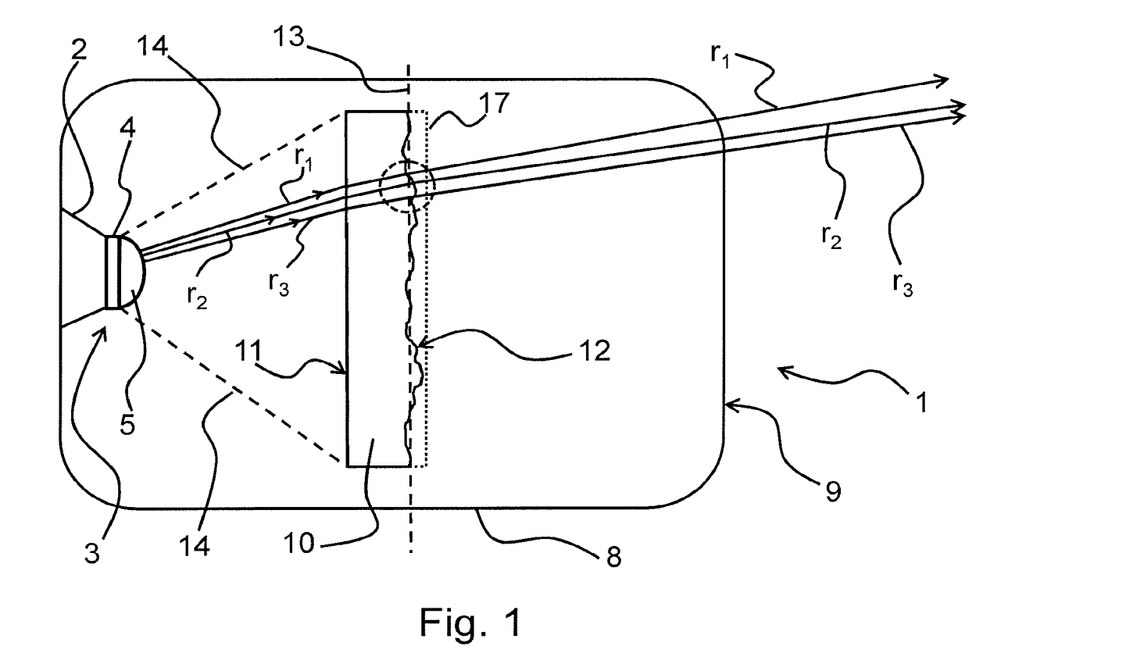
FIG. 1 is a diagrammatic view of a beam generator and an optical element of a lighting device according to a first embodiment of the invention.
Figure 2:
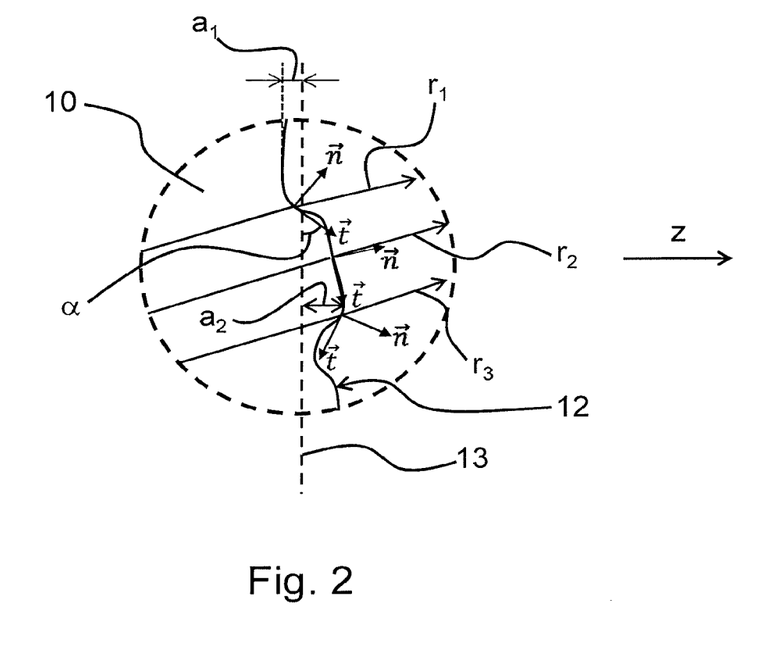
FIG. 2 is an enlarged view of a portion of FIG. 1.

FIGS. 1 and 2 illustrate an example of a vehicle lighting device 1 according to the invention. These figures also make it possible to illustrate the general principle of the invention.

According to the invention, the lighting device 1 comprises an optical element 10 having a controlled caustic generator surface 12. This generator surface 12 may a reflecting surface or a refracting surface, as shown in FIGS. 1 and 2. This optical element is referred to hereinafter as the caustic generator 10.

The generator surface 12 extends with a given overall shape 13 represented by the vertical dashed line in FIGS. 1 and 2.

More particularly, in the embodiment from FIG. 1, the caustic generator 10 is a transparent plate having an entry face 11 and an exit face. The entry face 11 is arranged facing a light ray beam generator 3 so as to receive the rays $r_1$, $r_2$, $r_3$ emitted by the beam generator 3. The exit face is arranged to receive the rays $r_1$, $r_2$, $r_3$ refracted by the entry face 11.

As in the example shown, the exit face may be formed, notably entirely, by the generator surface 12.

As a general rule, the generator surface 12 features local variations of shape around the given overall shape 13. These local variations are distributed over all of the generator surface 12 and so confer on the whole of the generator surface 12 a relief forming an object pattern.

For example, as shown in FIGS. 1 and 2, these local variations form recesses and bosses on the exit face of said caustic generator 10.

As a general rule, these various local variations are such that the majority of said generator surface 12 is smooth. For the majority of the generator surface 12, this surface is therefore differentiable at any point. In other words, over the smooth areas, it is free of projecting or recessed edges.

As a general rule, these various local variations are such that for the beam of rays $r_1$, $r_2$, $r_3$ incident on the whole of said generator surface 12, these rays $r_1$, $r_2$, $r_3$ having a known given distribution, the generator surface 12 deviates the rays $r_1$, $r_2$, $r_3$ with different orientations as a function of the local variations that they encounter, therefore forming a deviated beam propagating a light pattern over a usable range extending on the upstream side and at least as far as a given finite optimum propagation distance, termed the optimum distance, this propagated pattern corresponding to a distorted projection of the object pattern.

This generator surface 12 with its local variations corresponds to a controlled caustic generator surface.

Indeed, these local variations create local convergences and divergences of the rays. As these variations are local, a majority of rays move away from one another or toward one another without crossing before a certain distance. In the same way as the surface of a swimming pool through which sun rays pass creates a light pattern propagating and projecting onto the bottom of a swimming pool, the generator surface 12 creates a light pattern that propagates, the propagated pattern.

In the case of a swimming pool, this pattern generally propagates over a distance of 3 metres. The propagated pattern is therefore observable when projected onto the bottom of the swimming pool, whether the bottom is at 1.5 m or at 2 m. This bottom therefore forms the screen on which the caustic forming the propagated pattern can be observed.

In the case of a controlled caustic generator surface, like that of the invention, and depending on the local variations, the light pattern propagates at least over a given optimum distance. Beyond this optimum distance $D_p$, the rays of the deviated beam cross.

Figure 4:
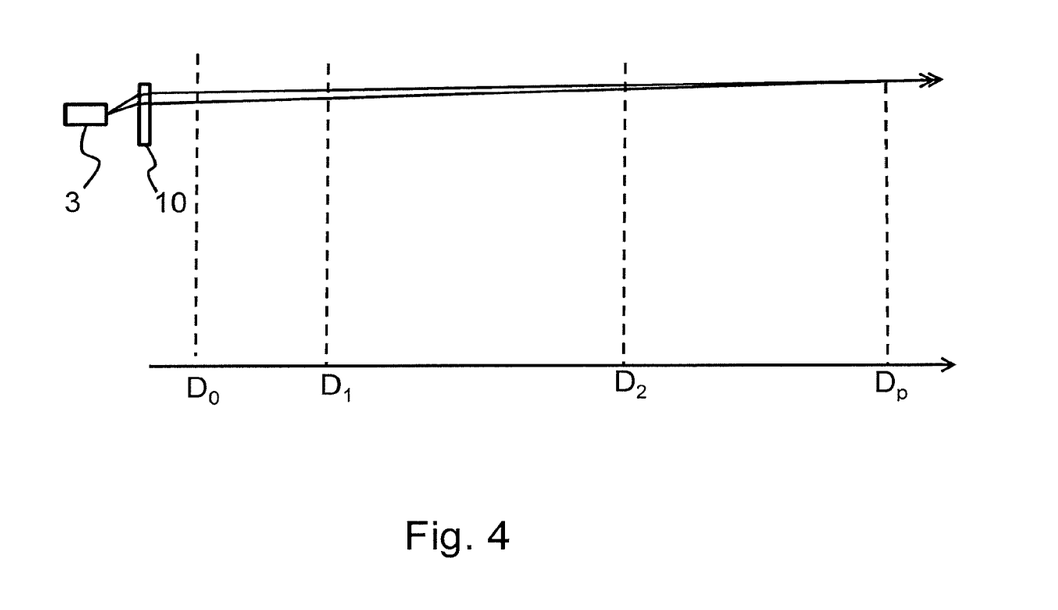
FIG. 4 represents diagrammatically the propagation of a target pattern by a beam generator and an optical element of a lighting device according to the invention.

In the context of the invention, and as can be seen in the FIG. 4 theoretical diagram, the optimum distance $D_p$ is finite. If a screen is interposed at an intermediate distance $D_1$ or at another intermediate distance $D_2$, which are less than the optimum distance $D_p$, the same pattern will be observed distorted to a greater or lesser degree.

Note that this optimum distance $D_p$ is that at which the pattern will be sharpest. The generator surface can therefore be designed with reference to this definition.

There may equally exist a minimum distance $D_0$ below which the pattern is not formed. As a general rule this minimum distance $D_0$ is relatively short. This minimum distance $D_0$ may be a few centimetres, or even a few millimetres, depending on the application, such as an application to a motor vehicle lighting device. In this latter case it may be less than 1 centimetre (cm).

Equally, the pattern is not lost as soon as the rays cross but afterwards, at a greater maximum distance (not shown). It is however easier to design the generator surface relative to the crossing distance of the rays, which is defined more precisely than the distance at which it is considered that the pattern is lost. In the present application, this ray crossing distance is therefore termed the optimum propagation distance or optimum distance.

In other words, the usable range comprises a downstream portion, from the optimum distance $D_p$ to this maximum distance, and an upstream portion, from the minimum distance $D_0$ to the optimum distance $D_p$. The motif that can be observed at the optimum distance $D_p$, if a screen is placed there, remains identifiable within these upstream and downstream portions.

In the case of the invention, this downstream portion may generally have a value different from that of the upstream portion. In particular, it may be less than more than half thereof.

For example, in a light with a sufficient closing outer lens portion, with an optimum distance $D_p$ of 20 cm, a minimum distance $D_0$ of 1 cm, the value of the upstream portion would be 19 cm, and the downstream portion could be less than 9.5 cm.

In particular, said caustic generator 10 and its local variations are such that a propagated pattern is projected onto a target surface, which forms the screen, to form there a light pattern, termed the target pattern. This target surface is visible from outside the lighting device 1 and is situated at a distance within the usable range. The target surface may be at or near the optimum distance $D_p$, which improves sharpness.

As a general rule, to produce the generator surface 12, the latter is notably calculated taking into account the target pattern that it is wished to display, the shape of the target surface and its arrangement relative to the light rays forming the target pattern, together with the given distribution of the rays $r_1$, $r_2$, $r_3$ on emission by the beam generator 3, in particular their incidence on said caustic generator 10.

Figure 3:
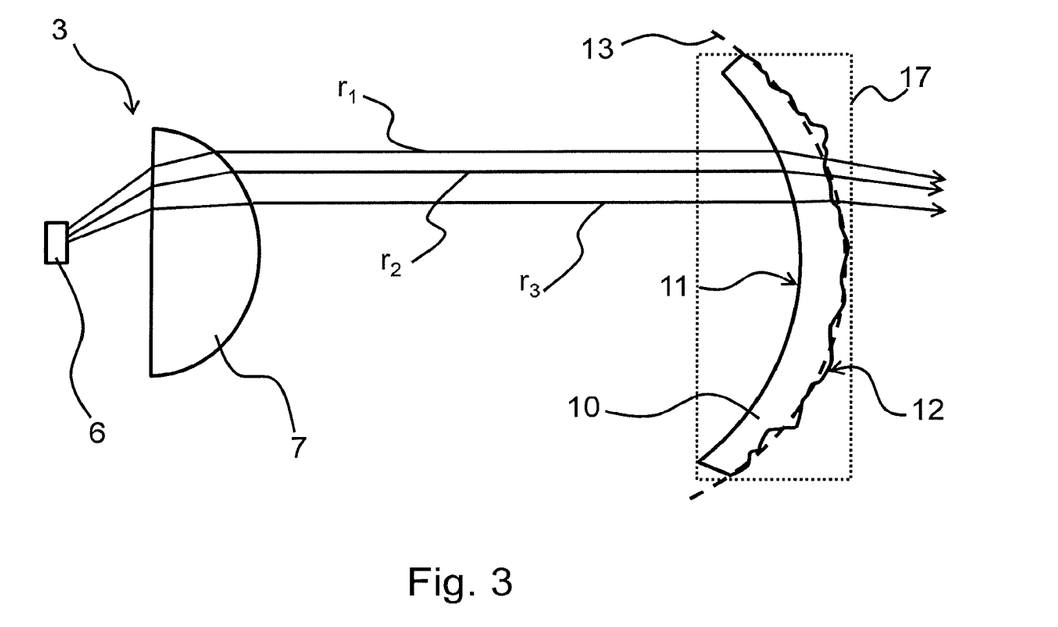
FIG. 3 is a diagrammatic view of a beam generator and an optical element of a lighting device according to a second embodiment of the invention.

According to the invention, the given distribution may correspond to substantially parallel rays $r_1$, $r_2$, $r_3$ as shown in FIG. 3, or, notably, as shown in FIGS. 1 and 2, rays distributed substantially globally in an emission cone 14, notably with a divergent light source, such as an LED. This simplifies establishing the angle of incidence of the rays on said caustic generator 10, thus simplifying the calculation of the generator surface 12.

For this, it is possible to consider that the given distribution is such that for any plane perpendicular to the propagation direction, at any point of that plane, the ray or rays incident at that point come from a single direction. Indeed, the distribution of the rays emitted by an LED substantially corresponds to a given distribution of this kind.

To simplify the calculation, it is possible for the surface to comprise numerous discrete elementary surfaces and to compare the latter to the points mentioned in the preceding paragraph.

The lighting device 1 may be shipped without the beam generator 3, but have a mounting part 2 on which it is intended to be mounted, so that the rays $r_1, r_2, r_3$ are incident on said generator surface 12.

In particular, this mounting part 2 and the beam generator 3 may be such that the beam emitted by the beam generator 3 when mounted has a given overall direction relative to said caustic generator 10. There is therefore no need at assembly time to adjust this orientation so that it corresponds to the arrangement enabling generation of the target pattern.

It is to be noted that these caustic generator surfaces do not necessitate great precision as regards the positioning of the beam generator 3. Assembly is therefore simplified.

In the example shown in FIG. 1, the beam generator 3 is mounted on the mounting part 2.

The beam generator 3 may as here be formed by a light-emitting diode (LED). In FIG. 1 there is diagrammatically represented a photo-emitting element 4 of the LED with, stuck on top, a transparent protective dome 5.

The target surface may be a screen of the lighting device, a surface of the passenger compartment of the vehicle or a surface outside the vehicle, such as the road.

Figure 15A:
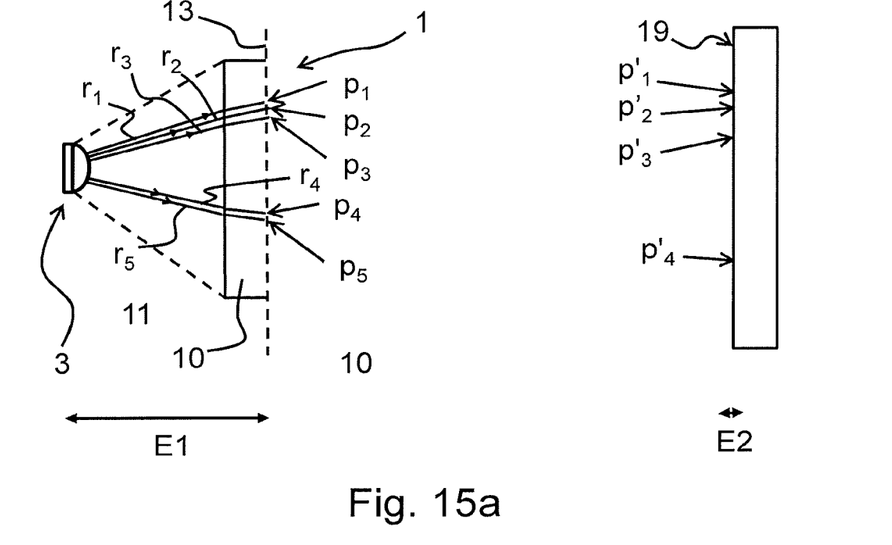
Figure 15B:
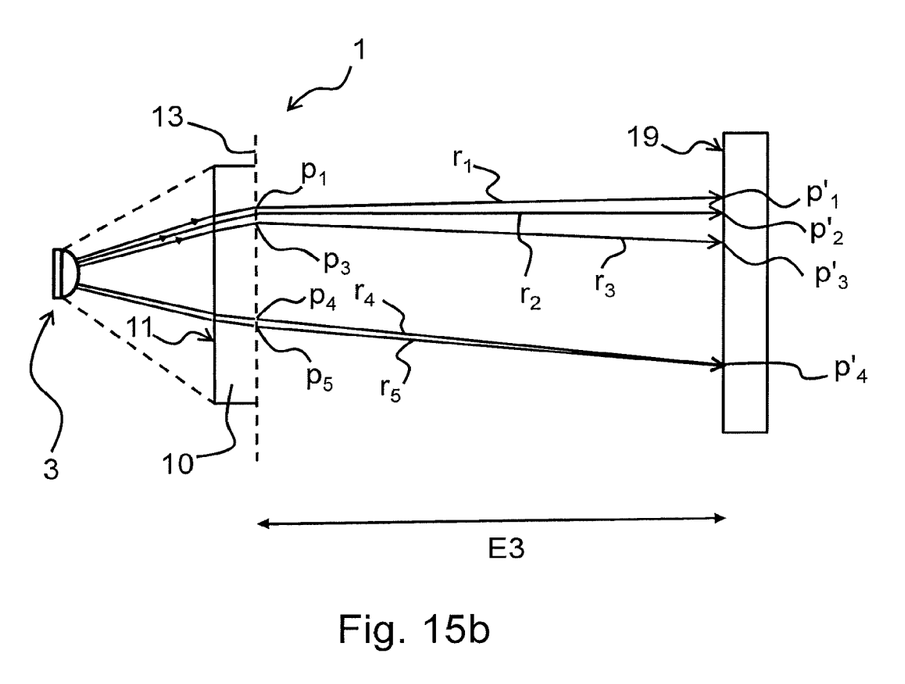

The methods of calculating this generator surface 12 may follow the following procedure, one example of which is shown in FIGS. 15a to 15f:

in a step E1, termed the upstream step, shown in FIG. 15a, establish the relations defining the angle of incidence of the rays $r_1, r_2, r_3, r_4, r_5$ and their distribution at each point of the given overall shape 13, taking into account the given distribution of the rays $r_1, r_2, r_3$, otherwise making it possible also to define the brightness of each point at the level of the given overall shape 13 on said caustic generator 10, termed the object point $p_1, p_2, p_3, p_4, p_5$, in a step E2, termed the downstream step, which may be executed before, after or at the same time as said upstream step E1, define the luminous distribution over the target surface making it possible to obtain the target pattern, and therefore define the brightness at each point of the target surface 19, termed the target point $p'_1, p'_2, p'_3, p'_4$, then, in a correlation step E3, shown in FIG. 15b, establish a relation between each object point $p_1, p_2, p_3, p_4, p_5$ and each target point $p'_1, p'_2, p'_3, p'_4$, notably so that each target point $p'_1, p'_2, p'_3, p'_4$ that receives light is associated with only one or a set of object points $p_1, p_2, p_3, p_4, p_5$ making it possible to obtain the brightness at these points required to form the pattern, thereafter, in a step E4/E5 of orientation of the local variations, shown in FIGS. 15c to 15f, as a function of the target points and object points associated by the relation established in the correlation step E3, determine the orientation of the local variations to be applied to the overall shapes so that the rays $r_1, r_2, r_3, r_4, r_5$ incident at the object points $p_1, p_2, p_3, p_4, p_5$ are deviated so as to have the orientation enabling them to reach the target points $p'_1, p'_2, p'_3, p'_4$ associated therewith via this relation.

The upstream step E1 takes into account the distribution of the rays upon their arrival at the level of the given overall shape 13. The simplest case, not shown, is that of an optical element 10, such as that shown in FIGS. 1 and 15a, formed of a transparent plate the entry face 11 of which and the given overall shape 13 of the generator surface 12 are plane, and with a beam generator 3, such as that from FIG. 3, emitting parallel rays.

In this simple case, the beam generator 3 and said caustic generator 10 are such that the rays are perpendicular to the entry face 11. These rays are therefore not deviated before encountering the exit surface on which the generator surface is formed.

The embodiment from FIGS. 1 and 2 and FIGS. 15a to 15f represents an intermediate case in which the rays are distributed in an initial cone 14 at the outlet of the beam generator 3 and then refracted by the plane entry face, therefore remaining inscribed in a cone, enabling easy determination of the angle of incidence of the rays $r_1, r_2, r_3, r_4, r_5$ on the overall shape 13, and thus easy determination of the angle of incidence of the rays $r_1, r_2, r_3, r_4, r_5$ on the generator surface 12.

The embodiment from FIG. 3 represents another intermediate case in which the distribution of the rays $r_1, r_2, r_3$ is initially simpler, since they are parallel at the exit of the beam generator 3. On the other hand, they are then refracted differently by the entry face 11 because the latter is curved, for example a cylinder with a circular or elliptical section. However, this curvature being defined, it makes it possible to determine the orientation of the rays $r_1, r_2, r_3$ on their arrival at the level of the given overall shape 13 of the generator surface 12, which for its part is also curved.

In the example shown in FIG. 3, the optical element is a curved transparent plate, the entry face 11 of which and the general shape 13 of the generator surface 12 are cylindrical. So as to have parallel rays, the beam generator 3 may comprise a light source 6, such as a light-emitting diode, and a collimator lens 7 the diopters of which enable parallel orientation of the rays.

More complicated cases can however be envisaged, with
rays distributed in an emission cone,
a curved, notably cylindrical, entry surface, and
a generator surface of given curved overall shape.

It is equally possible to envisage other given distributions of the rays.

Concerning the downstream step E2, the simplest case is then for the target surface 19 to be plane and perpendicular to the overall direction of emission of the rays on arriving at the level of the overall shape 13 of the generator surface 12 to be calculated. The target pattern then corresponds to the propagated pattern.

In more complex cases, account must be taken of the orientation of the plane target surface, at an angle to the overall direction of transmission of the rays on arrival at the level of the generator surface. Such determination remains simple, however. It is more complicated, but achievable, when the target surface is not plane. Account must then be taken of its shape, notably to define it by an equation in order to determine the light distribution, so as to be able to observe the target pattern when projected. In all these more complex cases, the propagated pattern, if defined in a plane perpendicular to the propagation direction thereof, differs from the target pattern.

Thereafter, various methods may be used to carry out the step E3 of correlating the rays incident on the overall shape 13 of the generator surface 12 with the distribution of light over the target surface 19.

As explained above, this correlation step enables determination of which object points $p_1, p_2, p_3, p_4, p_5$ of the given overall shape 13 are associated with which target points $p'_1$, $p'_2$, $p'_3$, $p'_4$ of the target surface 19.

Thanks to the upstream step E1 the orientation of the rays $r_1$, $r_2$, $r_3$, $r_4$, $r_5$ on arrival at the level of the given overall shape 13 of the generator surface 12 is known. Moreover, the correlation between target points $p'_1$, $p'_2$, $p'_3$, $p'_4$ and object points $p_1$, $p_2$, $p_3$, $p_4$, $p_5$ determines the orientation of the rays $r_1$, $r_2$, $r_3$, $r_4$, $r_5$ on departing from this given overall shape 13 to join the object points $p_1$, $p_2$, $p_3$, $p_4$, $p_5$ to the target points $p'_1$, $p'_2$, $p'_3$, $p'_4$ with which they are correlated.

This therefore enables execution of the orientation step E4/E5, by calculating the variation to be assigned to the exit surface relative to this given overall shape 13 at all points of the latter, which enables definition of the generator surface 12.

Once this calculation has been done, it is therefore seen that, as a function of the amplitudes of the local variations, the generator surface 12 is at a greater or lesser distance from the given overall shape 13. To refine the calculation of the generator surface 12, it is therefore possible to repeat the upstream and downstream steps as well as the definition step, considering the arrival of the rays at their departure relative to the shape of the generator surface obtained previously and no longer relative to the given overall shape. The accuracy of this surface and therefore the sharpness of the image will improve with the number of iterations. Moreover, this also enables smoothing of the generator surface.

To carry out the orientation step, it is possible to use Descartes' laws, also known as Snell's laws in some English-speaking countries, or again as Snell-Descartes' laws.

Figure 15C:
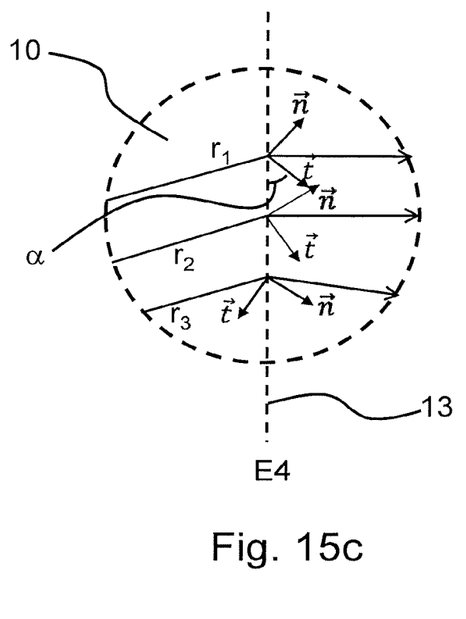
Figure 15D:
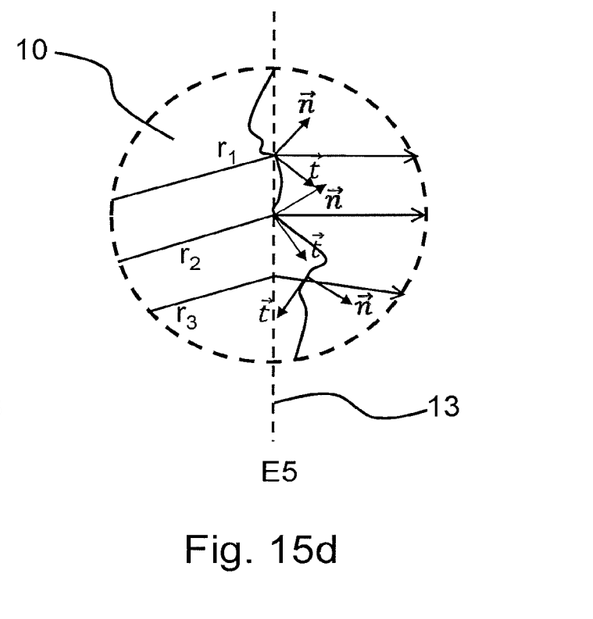
Figure 15E:
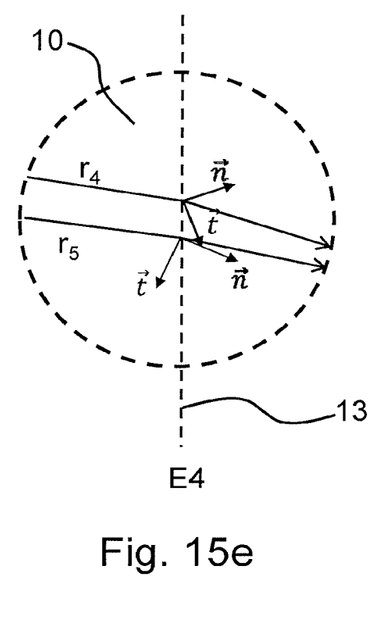

Accordingly, in a substep E4, shown in FIGS. 15c and 15e, for an object point $p_1$, $p_2$, $p_3$, $p_4$, $p_5$ of the given overall shape 13 or of the generator surface calculated previously, with the direction of arrival and the direction of departure of the rays $r_1$, $r_2$, $r_3$, $r_4$, $r_5$, it is possible to determine the tangent $\vec{t}$ and the normal $\vec{n}$ of the exit surface at that point for which the latter deviates each incident ray $r_1$, $r_2$, $r_3$, $r_4$, $r_5$ arriving in the corresponding refraction direction.

Figure 15F:
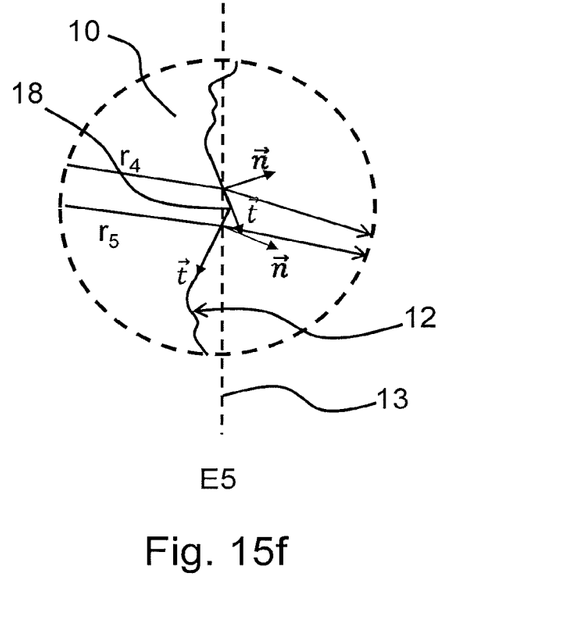

In a substep E5, shown in FIGS. 15d and 15f, the generator surface 12 having these normals is determined by determining all of the normals $\vec{n}$, also known as normal fields.

FIGS. 15c and 15d illustrate the execution of these two substeps with magnification at the level of the object points $p_1$, $p_2$, $p_3$, not referenced in FIGS. 15c and 15d for greater clarity.

FIGS. 15e and 15f illustrate the execution of these two substeps with magnification at the level of the object points $p_4$, $p_5$ not referenced in FIGS. 15e and 15f for greater clarity.

In FIG. 2, there can be seen the local variations of the generator surface 12 relative to the given overall shape 13, which is plane in this example. These local variations correspond to changes of slope, defined by the normal $\vec{n}$ and/or the tangent $\vec{t}$ to the generator surface 12 at the level of the local variations. The result of this is that this generator surface 12 departs from the overall shape 13 and forms bosses and recesses.

For greater clarity the normals $\vec{n}$ and tangents $\vec{t}$ have been shown here for only three points on the generator surface 12, but the normal and/or the tangent is or are calculated for all the points.

The amplitude of a local variation may in this application be defined as the distance between the local variation and said overall shape 13 along the normal at a given point of the overall shape 13.

If the overall shape is plane, as in FIGS. 1 and 2, any point on the given overall shape can be defined by a dimension in a single direction z perpendicular to this overall shape 13.

There is seen in FIG. 2 a minimum amplitude $a_1$, by convention negative because it is situated on the upstream side of the generator surface 12, and a maximum amplitude $a_2$ downstream of the generator surface 12, by positive convention.

Note that in the method shown, it is possible to divide the surface into numerous discrete elementary surfaces and to compare the latter to the points $p_1$, $p_2$, $p_3$, $p_4$, $p_5$, $p'_1$, $p'_2$, $p'_3$, $p'_4$ referred to.

Figure 5:
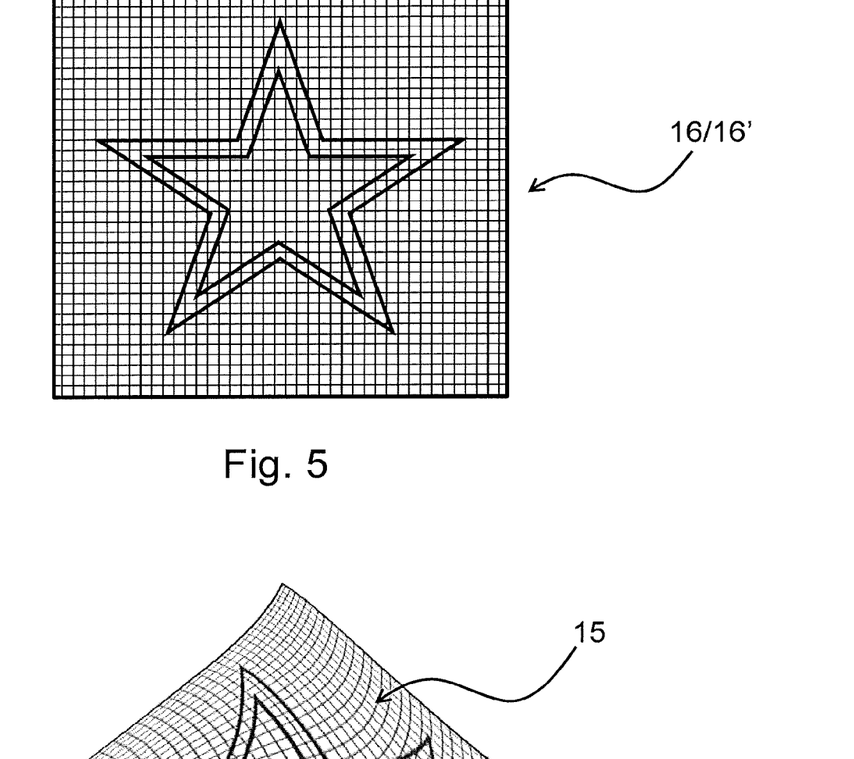
FIG. 5 represents diagrammatically a target pattern formed by a beam generator and an optical element of a lighting device according to the invention.

FIG. 5 illustrates the propagated pattern 16, as it will be seen on a flat screen perpendicular to the propagation direction and at a distance equal to or close to the propagation distance. If the target surface is also plane and oriented thus, then this propagated pattern 16 will also be the target pattern 16' seen in FIG. 5. Otherwise, it will be deformed.

Figure 6:
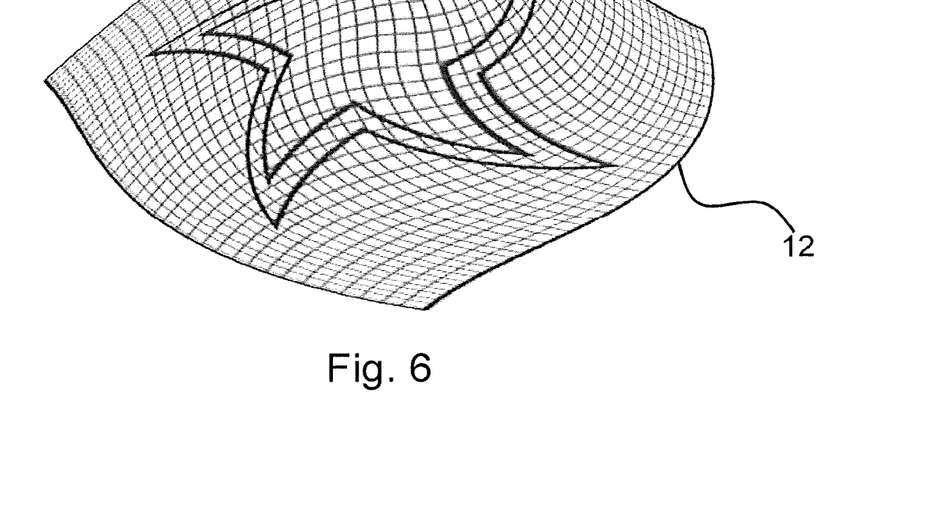
FIG. 6 represents diagrammatically the object pattern of the generator surface enabling generation of the target pattern from FIG. 5.

The generator surface 12 that made it possible to produce this propagated pattern 16 is shown in FIG. 6. Because of the relief formed on this surface 12, the object pattern 15 formed by this relief and therefore the local variations can be seen. This object pattern 15, symbolically represented in FIG. 6, corresponds to a distorted shape of the propagated pattern 16.

If the FIG. 5 pattern were also required to be the target pattern 16' observed by a driver observing the carriageway, the target pattern being formed by grazing incidence rays relative to the carriageway because coming for example from a rear light, the propagated pattern would then have to be distorted relative to the target pattern, to observe the star on the road as represented in FIG. 5.

According to the invention, and as in FIGS. 1 and 2, the generator surface 12 may be such, and therefore calculated, so that, for the majority of the generator surface 12, namely smooth portions representing the majority of that surface, the passage from one local variation to the other is smooth. This is notably the case of the portion shown in FIG. 2. If for the calculations the local variations are not considered as points but as small zones of the generator surface, notably infinitesimally small zones, the generator surface 12 may moreover be such that, for these smooth portions, the local variations are smooth.

In particular, one of the smooth portions may have a surface representing the majority of the generator surface.

A first example calculation method may be used to calculate this generator surface 12. This is the method disclosed in the document Yue et al. [1]. That document notably indicates the various steps for constructing the generator surface 12 starting from a given example, in particular to establish the relation between the points of the generator surface 12 and those of the target surface.

This first method example enables a totally smooth generator surface 12 to be obtained. The passage from one local variation to the other is smooth.

To establish the relation of the correlation step, notably as in this first method, a condition is set as establishing a bijection between the object points and the target points. Accordingly, the whole of the generator surface 12 is such that:

each local variation deviates the incident light rays to form one and only one portion of the target pattern 16' that is distinct from the portions of the target pattern formed by the other local variations, and for the whole of the target pattern, each portion of the target pattern receives the light rays coming from one and only one local variation.

This method enables good brightness gradients and good resolution. It may for example be used to produce the generator surface 12 from FIG. 1.

According to other methods, for improved contrast and to have darker zones and zones with maximum brightness, it is possible to adapt the local variations so that the generator surface 12 has one or more edges.

Depending on the case, the generator surface 12 comprises:

- at least one edge delimiting portions of the generator surface with different orientations so as to generate a divergence such that certain zones of the target pattern receive virtually no rays, or even no rays at all, thus forming dark zones, and/or
- at least one edge delimiting portions of the generator surface with different orientations so as to generate a convergence such that certain zones of the target pattern receive the rays from a plurality of local variations and/or a plurality of portions of this generator surface.

This notably enables production of patterns with lines of light or very clear writing.

A second calculation method may be used for this, for example, to calculate the generator surface 12, as disclosed in the document Schwartzburg et al. [2].

In this second method, no bijection constraint is used in the correlation step. This method is more complex but enables a higher contrast to be obtained, namely a higher ratio between the light zones and the dark zones. This method in fact enables zones to be obtained darker than those of the Yue et al method mentioned above. With this second method it is therefore possible to obtain more marked demarcations between dark zones and light zones. The portions away from the edges are smooth, the passage from one local variation to the other being smooth.

In FIGS. 15a to 15f, for example, the method used does not impose a bijection constraint to establish the target pattern. At certain locations, a plurality of object points $p_4$, $p_5$ correspond to a single target point $p'_4$. The result of this is that the generator surface 12 features a slope variation discontinuity, corresponding to an outward edge 18 on the generator surface 12, and therefore inward in the direction of the incident rays. The local variations on either side of this edge 18 enable concentration of the rays r4, r5 on a line of the target surface, for example to form a sharp intense line.

Away from this edge 18, notably above and below it, the correlation step E3 has led, without constraining it, to a bijective relation between the corresponding object points $p_1$, $p_2$, $p_3$ and the corresponding target points $p'_1$, $p'_2$, $p'_3$.

Whatever the method used, each point on the generator surface 12 is therefore associated with an amplitude that corresponds to a distance from the overall shape 13, this amplitude being defined in a direction parallel to the normal to the overall shape 13 at that point.

As shown in FIGS. 1 and 3, for example, a plane is considered comprising the overall direction of the beam of incident rays. There is considered in this plane the rectangle 17 in which the caustic generator 10 is circumscribed, and this rectangle 17 may have a side length that is four times greater than, and notably six times greater than, that of the amplitude of each local variation relative to the given overall shape 13 at the level of that local variation, and therefore six times greater than the maximum amplitude.

Moreover, the local variations may have a tangent $\vec{t}$ forming an angle α with the given overall shape between −60 and 60 degrees inclusive, notably between −30 and 30 degrees inclusive.

Combining these slope and amplitude conditions yields optimum results, notably in terms of contrast and sharpness, notably enabling propagation of the propagated pattern over the usable range, in particular at the optimum distance $D_p$.

It is to be noted that the smaller the light source 4, 6 of the beam generator 3 relative to the generator surface 12, the closer is the projected pattern to the required pattern used for the construction of the generator surface. For example, the side length of the rectangle 17 in which the caustic generator 10 is circumscribed may be at least ten times greater, notably thirty times greater, than that of a side length of that light source 3, 6, notably when that source is a light-emitting diode.

The two embodiments from FIGS. 1 to 3 are aimed at caustic generators functioning by refraction.

Here the generator surface 12 is formed on an optical element 10 specifically dedicated to this. However, it may equally be formed on elements having other functions, such as a closing outer lens of the lighting device, an optical lens, a mask.

In the application, "mask" denotes the embellisher intended to mask certain elements such as cables, the bottom of the housing. It is also known as a bezel.

Moreover, FIGS. 1 to 3 illustrate situations in which the generator surface 12 is on the exit face of the caustic generator 10. This is not limiting on the invention, however, and, generally speaking, the optical element can have a generator surface on the entry face and/or the exit face.

Figure 14:
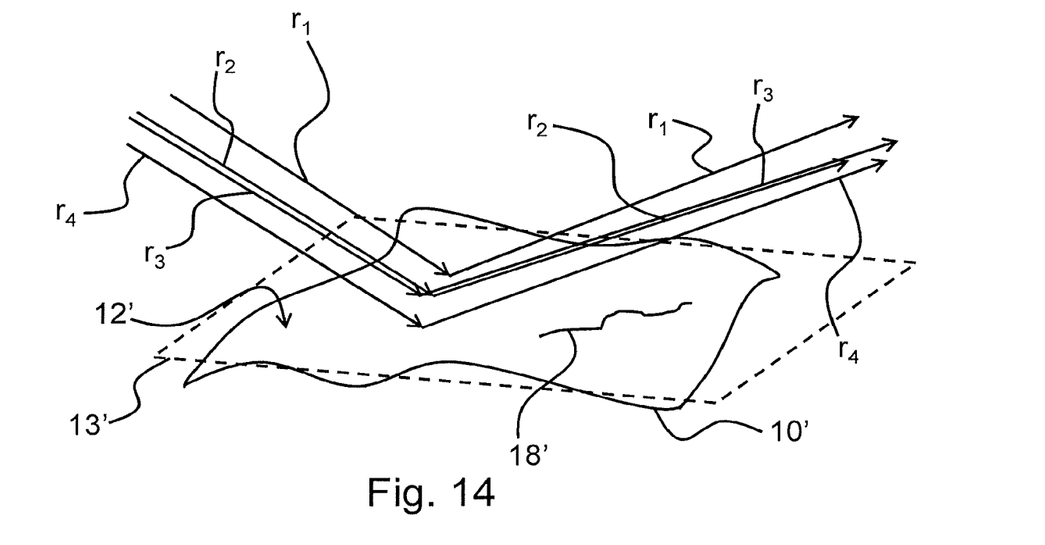
FIG. 14 is a diagram of a third embodiment of the invention.

FIG. 14 illustrates a third embodiment in which the optical element 10' or caustic generator 10' functions by reflection.

Here the caustic generator 10' is a mirror the reflecting surface of which forms the generator surface 12', featuring local variations about its plane overall shape 13'.

This mirror 10' may have one or more edges. Here, there is an inward edge 18', namely forming the bottom of a recess, delimiting surface portions with an orientation facing one another, the latter portions therefore enabling creation of an intense line of light of particular shape on the target pattern, not shown.

The same construction methods may be applied to this reflecting generator surface 12', taking into account during the various steps of the method that it is a question of reflection and not of refraction.

In such a case, the upstream step is simplified because the rays $r_1$, $r_2$, $r_3$, $r_4$ arrive directly on the generator surface 12 in accordance with the given distribution and also depart directly.

Figure 7:
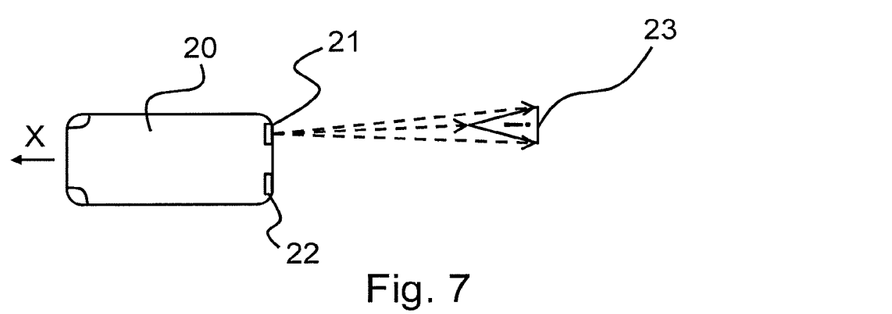
FIG. 7 represents a first example of a lighting device according to the invention.

FIG. 7 shows a first example of lighting device according to the invention. In the case shown, a vehicle 20 with longitudinal axis X is equipped with two lighting devices according to the invention, which here are a righthand rear light 21 and a lefthand rear light 22.

For example, each of these two rear lights 21, 22 includes a housing and a corresponding outer lens closing the housing. Each closing outer lens comprise a portion the diopter of which between the outer lens and the exterior forms the generator surface. Each of these generator surfaces receives some of the light rays coming from a light source of the corresponding rear light 21, 22. There could equally be provided a light source specifically dedicated to this generator surface.

The generator surface of the righthand rear light 21 is adapted to generate a target pattern 23 on the road forming a logo, here calling on following vehicles to be vigilant.

FIG. 7 being an overhead view, this logo is stretched out but will be perceived by following vehicles as less stretched. The object pattern, not shown, formed by the relief of the corresponding generator surface has a distorted form of this target pattern.

In this example, it is clear that, in the propagation direction, the distance of the pattern between the generator surface and the target surface, namely the road, is going to vary as a function of the ride attitude of the vehicle 20, for example whether it is laden or not. Here the generator surface is such that when the ride attitude of the vehicle 20 is horizontal, on a horizontal road, the given optimum distance $D_p$ is greater than, for example twice, the distance between the generator surface and the road in the direction of propagation of the propagated pattern. This makes it possible to have a visible sharp target pattern, whatever the orientation of the vehicle 20, in particular its ride attitude. The target pattern therefore remains visible when ascending, descending, braking or accelerating, and whatever the load.

In this example, the generator surface of the righthand rear light 21 receives the light rays from the light source enabling generation of a stop light.

It is to be noted that the lights could equally be constructed in accordance with the principle shown in FIGS. 1 and 3. In this case, instead of the generator surface being formed on the closing outer lens 9 closing the housing 8, the latter is, as described above, formed on a transparent plate 10 specifically designed to have the generator surface.

Figure 8:
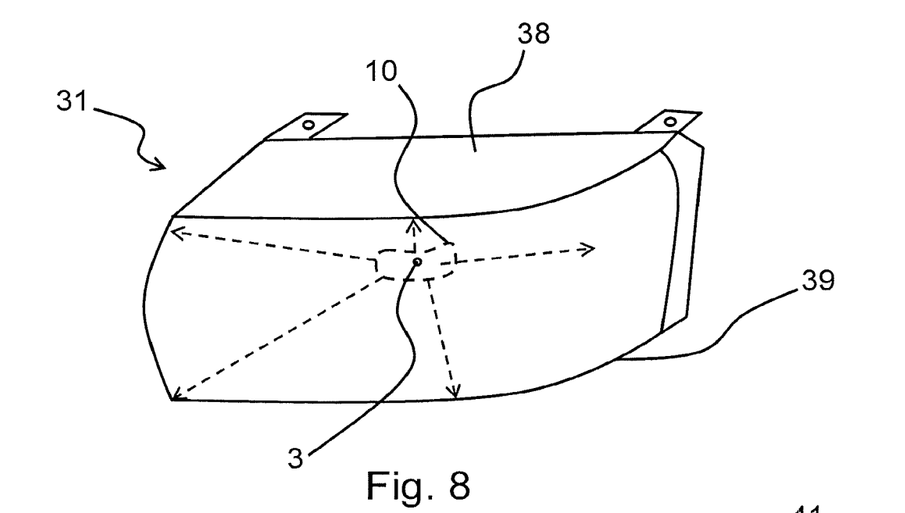
FIG. 8 represents a second example of a lighting device according to the invention.

FIG. 8 shows a second example of lighting device according to the invention. This lighting device is a signalling light 31, here the righthand rear light. The light 31 comprises a housing 38 and an outer lens 39 closing the housing through which exit the rays emitted by the light 31. The outer lens 39 is a textured surface, notably sand-blasted, translucent plate.

Inside the housing 38, a caustic generator 10 is arranged in front of a beam generator 3 and receives on its entry face the rays emitted by the latter. The generator surface of the caustic generator 10 is formed on the exit face of the latter and deviates the rays so as to distribute them over the majority or even the whole of the outer lens 39. These rays are represented in FIG. 8 by the dashed line arrows.

The outer lens 39 having a textured surface, it therefore forms a screen, its surface inside the light 31 forming the target surface. The target pattern is therefore formed on the outer lens 39.

The caustic generator 10 may for example have a shape similar to that of the closing outer lens 39.

The generator surface and the outer lens 39 are arranged so that the target pattern forms the illuminating surface of the signalling function and has the photometric distribution of a signalling light.

Thus a signalling light is formed with a lit appearance when turned on, for example forming a rear position light beam, whilst having a different appearance when turned off.

Figure 9:
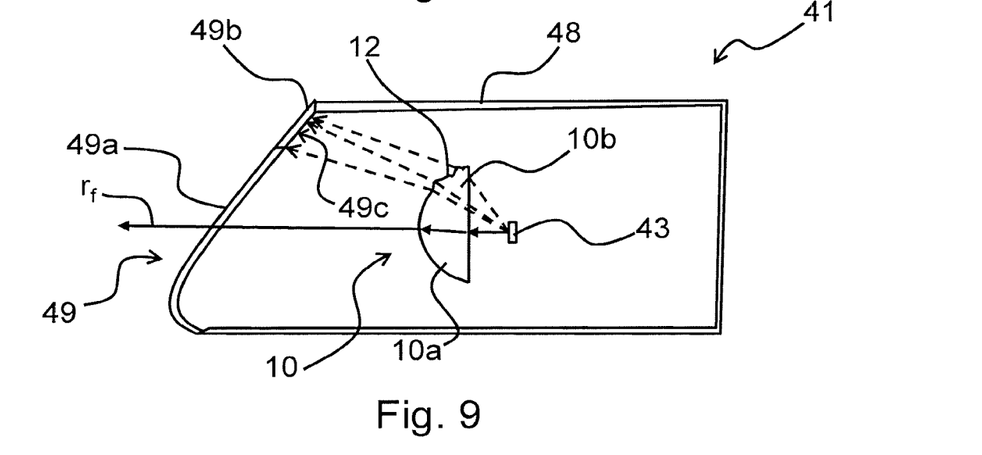
FIG. 9 represents a third example of a lighting device according to the invention.

FIG. 9 shows a third example of lighting device according to the invention. This lighting device is a light 41 which comprises a housing 48 and an outer lens 49 closing the housing through which exit the rays emitted by the light 41.

A beam generator 3 is placed in the housing 48. The caustic generator is a lens 10 having a principal portion 10a that collects some of the light rays $r_f$ emitted by the beam generator 3 (only one is represented in FIG. 9). The principal portion 10a of the lens is adapted to deviate the latter rays $r_f$ so as to form a daylight running position light. These rays $r_f$ pass through a principal portion 49a of the outer lens 49.

Other rays emitted by the beam generator 3 are collected by a secondary portion 10b of the lens 10. This portion 10b can as here be arranged on the upper edge of the lens 10. These rays are represented in dashed line in FIG. 9.

A caustic generator surface 12 is formed on the exit diopter of the secondary portion 10b of the ends 10. This generator surface 12 deviates the corresponding rays so as to distribute them over a secondary portion 49b of the outer lens 49.

The secondary portion 49b of the outer lens 49 having a textured surface, it forms a screen, its surface 49c inside the light 41 forming the target surface. Thus the target pattern is formed on the secondary portion 49b, positioned here at the top of the outer lens 49. This target pattern is visible from the outside.

The generator surface 12 and the outer lens 49 are for example such that the target pattern forms a logo.

Accordingly, it is possible using the same source both to produce a daylight running position light function and to display a pattern, such as a logo.

According to a variant that is not shown, the light may feature a metallized mask, a portion of which features the generator surface. The lens may then have no generator surface and be arranged on the beam generator so that a secondary part of the beam is reflected at the generator surface formed on the mask to form the target pattern on the secondary portion of the outer lens. In such a situation the arrangement is such that either the secondary part of the beam bypasses the lens to reach the generator surface of the mask directly, or is deviated by the lens toward this generator surface.

Figure 10:
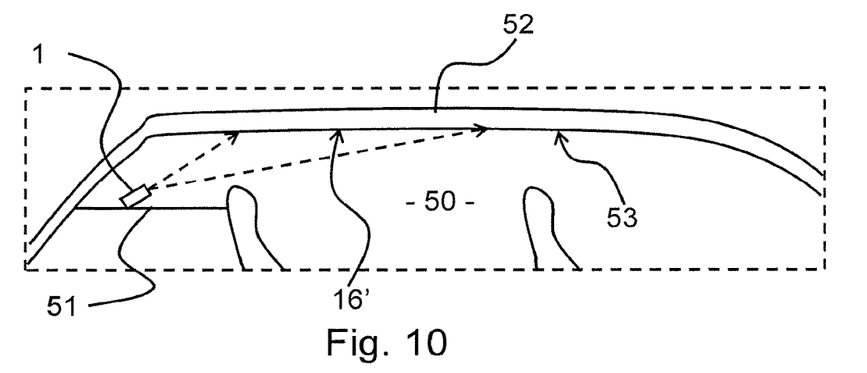
FIG. 10 represents a fourth example of a lighting device according to the invention.

FIG. 10 shows a fourth example of lighting device 1 according to the invention, for example that from FIG. 1. This lighting device 1 is in this example mounted inside the passenger compartment 50 of a vehicle, here on the rear parcel shelf 51.

This lighting device 1 is for example, as here, adapted to project a target pattern 16' onto a part of the interior surface 53 of the ceiling 52 of the vehicle, a part of that interior surface 53 therefore forming the target surface.

The target surface is slightly curved. Moreover, the beam propagating the propagated pattern, represented here by its two limiting rays indicated by the dashed line arrows, is at grazing incidence relative to the ceiling 52. The arrangement of the local variations on the generator surface is done so as to take this into account and so that the target pattern 16' appears to the passengers as in FIG. 5.

Figure 11:
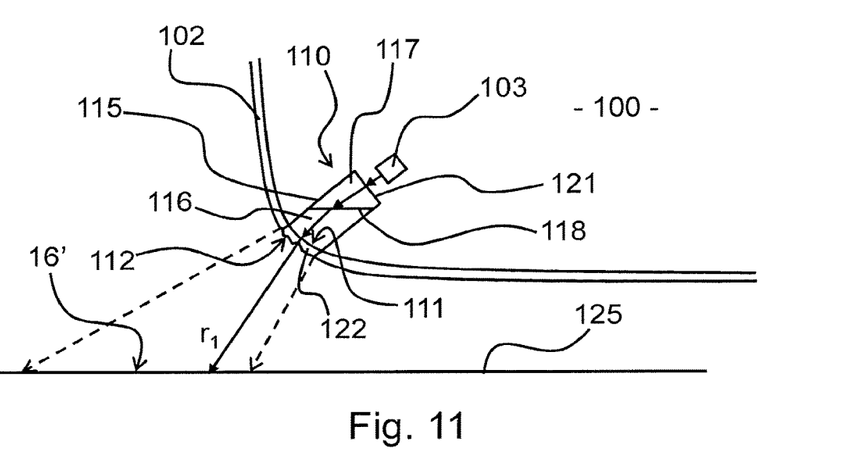
FIG. 11 represents a fifth example of a lighting device according to the invention, installed in a vehicle that stopped or moving at constant speed.
Figure 12:
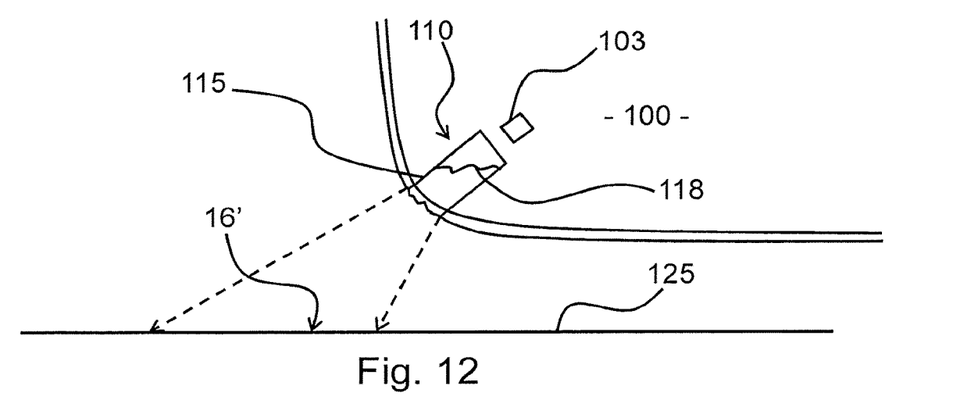
FIG. 12 corresponds to FIG. 11 when the vehicle starts, accelerates or brakes.

FIGS. 11 and 12 show a fifth example of lighting device according to the invention.

This lighting device is arranged at the rear of the vehicle 100, at the level of its rear bumper 102.

The optical element 110, namely the caustic generator, comprises a reservoir 115 containing a liquid 116 and air 117 forming between them a moving diopter 118. The reservoir 115 comprises an entry transparent wall 121 and an exit transparent wall 122 facing the latter.

The exit transparent wall 122 comprises an entry face 111 and an exit face on which the controlled caustic generator surface 112 is formed.

The light generator 103 is adapted to emit light rays $r_1$ toward the entry transparent wall 121 so that these rays $r_1$ pass in succession through: the entry transparent wall 121, the moving diopter 118, said entry face 111 and then the generator surface 112. The rays $r_1$ then exit the reservoir 115, and therefore the lighting device here, being oriented downward and backward relative to the vehicle 100, and thus in the direction of the road 125, which forms the target surface.

The set of these rays $r_1$, is delimited by the limiting rays indicated by the dashed line arrows.

The lighting device is for example adapted to form a target pattern 16', approximately such as shown in FIG. 5, on the carriageway 125, when the vehicle 100 is stopped, or moving at constant speed on a regular surface.

Figure 13:
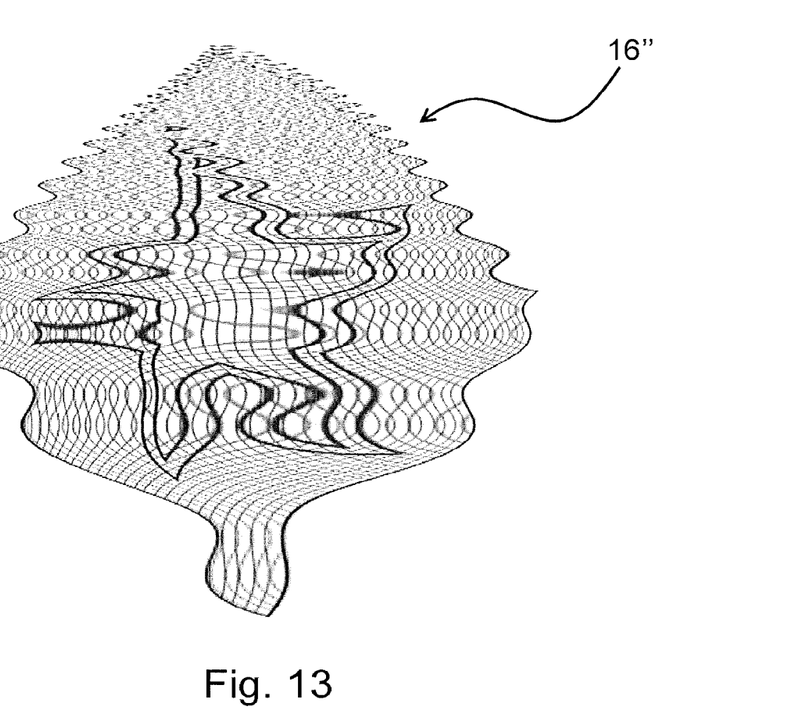
FIG. 13 represents the target pattern generated in the situation shown in FIG. 12.

In the event of starting, braking or accelerating, the moving diopter 118 is disturbed and deviates the rays in a random and different manner according to the points that form it. The target pattern 16' is then going to be disturbed, for example by superposed caustic or undulation effects, as in FIG. 13. Beyond a certain disturbance threshold, the target pattern will be lost.

This embodiment may be used as a styling effect on the outside or the inside of the vehicle 100 but also as an indicator of a change of speed of the vehicle.

LIST OF REFERENCES

[1] Yonghao Yue, Kei Iwasaki, Bing-Yu Chen, Yoshinori Dobashi, Tomoyuki Nishita. Poisson-Based Continuous Surface Generation for Goal-Based Caustics, *ACM Transactions on Graphics*, Vol. 31, No. 3, Article 31 (May 2014).

[2] Yuliy Schwartzburg, Romain Testuz, Andrea Tagliasacchi, Mark Pauly. High-contrast Computational Caustic Design, *ACM Transactions on Graphics* (Proceedings of ACM SIGGRAPH 2014), Vol. 33, Issue 4, Article No. 74 (July 2014)

The invention claimed is:

1. A vehicle lighting device comprising:
an optical element having a controlled caustic generator surface, the controlled caustic generator surface being a reflecting or refracting surface formed by irregular patterns of bosses and recesses extending in accordance with a given overall shape and having local variations of the given overall shape, the local variations being distributed over the controlled caustic generator surface so as to confer on the controlled caustic generator surface an object pattern, the local variations being such that a majority of the controlled caustic generator surface is smooth and such that for a beam of rays incident on the controlled caustic generator surface, the beam of rays having a given distribution, the controlled caustic generator surface deviates the beam of rays with different orientations as a function of the local variations, thus forming a deviated beam propagating an identifiable propagated pattern over a usable range extending in an upstream direction and at least as far as an optimum propagation distance, the identifiable propagated pattern corresponding to a distorted shape of the object pattern, and
a mounting part on which is to be mounted a beam generator of rays in accordance with the given distribution, so that the beam of rays are incident on the controlled caustic generator surface, wherein
the identifiable propagated pattern is projected onto a target surface, which is visible from outside the vehicle lighting device and which is situated inside a usable range or at a distance substantially equal to the optimum propagation distance.

2. The vehicle lighting device according to claim 1, wherein the given distribution is substantially such that for any plane transverse to a propagation direction, at a given point of that plane, the ray or rays incident at this point come from a single direction.

3. The vehicle lighting device according to claim 2, wherein the given distribution corresponds to that of a light-emitting diode.

4. The vehicle lighting device according to claim 2, wherein the vehicle lighting device comprises the beam generator of rays in accordance with the given distribution.

5. The vehicle lighting device according to claim 1, wherein the given distribution corresponds to that of a light-emitting diode.

6. The vehicle lighting device according to claim 1, wherein the vehicle lighting device comprises the beam generator of rays in accordance with the given distribution.

7. The vehicle lighting device according to claim 1, wherein the controlled caustic generator surface comprises at least one smooth portion the surface of which represents the majority of the controlled caustic generator surface, a passage from one local variation to the other being smooth inside the at least one smooth portion.

8. The vehicle lighting device according to claim 7, wherein all of the controlled caustic generator surface is smooth, the passage from one local variation to the other being smooth.

9. The vehicle lighting device according to claim 8, wherein the passage between certain local variations is formed by an edge.

10. The vehicle lighting device according to claim 1, wherein the beam generator comprises a light-emitting diode.

11. The vehicle lighting device according to claim 1, wherein the beam generator comprises a light source and an optic adapted with the light source to generate a beam of substantially parallel rays.

12. The vehicle lighting device according to claim 1, comprising a screen comprising a surface forming the target surface.

13. The vehicle lighting device according to claim 12, wherein the screen is formed by a diffusing translucent plate arranged in front of the beam generator.

14. The vehicle lighting device according to claim 13, comprising a housing and an outer lens the housing through which exit the beam of rays emitted by the vehicle lighting device, the closing outer lens forming the screen, the target surface aiming a part or the whole portion of the outer lens through which these rays exit.

15. A luminous device according to claim 1, wherein the vehicle lighting device is a signalling light, the controlled caustic generator surface and the target surface being such that target pattern forms a lighting surface of the signalling function.

16. The vehicle lighting device according to claim 1, wherein the vehicle lighting device is intended to be mounted inside a passenger compartment of a vehicle, the vehicle lighting device being such that once mounted in the vehicle, the vehicle lighting device can project a target pattern on an outside the vehicle lighting device and on another side onto a surface of the passenger compartment arranged at a distance from the optical element in the usable range or substantially equal to the distance from the optical element.

17. The vehicle lighting device according to claim 16, wherein the optical element is a mask.

18. The vehicle lighting device according to claim 1, wherein the optical element comprises a reflecting surface at least one portion of which is formed by the controlled caustic generator surface.

19. The vehicle lighting device according to claim 1, comprising a housing and an outer lens closing the housing through which exit the beam of rays emitted by the vehicle lighting device, the outer lens forming the optical element, the controlled caustic generator surface being formed on the surface of a portion of the outer lens, the deviated beam being formed by refraction of the beam of rays emitted by the beam generator.

20. The vehicle lighting device according to a claim 1, wherein the optical element comprises a reservoir containing a liquid and air forming between them a moving diopter, the reservoir comprising a transparent entry wall and a transparent exit wall facing the transparent entry wall, one of these walls comprising the controlled caustic generator surface, the controlled caustic generator surface being such as to emit a light beam toward the transparent entry wall so that the rays pass in succession through the transparent entry wall, the moving diopter and the transparent exit wall, passing through the controlled caustic generator surface.

\* \* \* \* \*